(12) United States Patent
Gessier et al.

(10) Patent No.: US 10,208,719 B2
(45) Date of Patent: Feb. 19, 2019

(54) DEVICE FOR THE THERMAL MANAGEMENT OF ENGINE INTAKE AIR

(71) Applicant: Valeo Systemes Thermiques, Le Mesnil Saint Denis (FR)

(72) Inventors: Bertrand Gessier, Le Mesnil Saint Denis (FR); José Borges-Alejo, Le Mesnil Saint Denis (FR); Zoulika Soukeur, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 21 days.

(21) Appl. No.: 15/551,783

(22) PCT Filed: Feb. 25, 2016

(86) PCT No.: PCT/EP2016/053987
§ 371 (c)(1),
(2) Date: Aug. 17, 2017

(87) PCT Pub. No.: WO2016/135244
PCT Pub. Date: Sep. 1, 2016

(65) Prior Publication Data
US 2018/0038324 A1    Feb. 8, 2018

(30) Foreign Application Priority Data
Feb. 25, 2015 (FR) .................................. 15 51609

(51) Int. Cl.
*F02B 33/44* (2006.01)
*F02M 35/10* (2006.01)
(Continued)

(52) U.S. Cl.
CPC ..... *F02M 35/10268* (2013.01); *F01N 3/0205* (2013.01); *F01N 5/02* (2013.01);
(Continued)

(58) Field of Classification Search
CPC .......... F02M 35/10268; F02M 31/205; F02M 31/10; F02M 31/02; F02M 31/042;
(Continued)

(56) References Cited

U.S. PATENT DOCUMENTS

| 5,740,786 A * | 4/1998 | Gartner ................... F02B 25/06 123/556 |
| 2005/0199229 A1* | 9/2005 | Eitel ................... F02B 29/0406 123/568.12 |

(Continued)

OTHER PUBLICATIONS

International Search Report issued in corresponding application No. PCT/EP2016/053987 dated May 4, 2016 (6 pages).
(Continued)

*Primary Examiner* — Marguerite McMahon
(74) *Attorney, Agent, or Firm* — Osha Liang LLP

(57) ABSTRACT

The present invention relates to a device (1) for the thermal management of the intake air of an internal combustion engine (3) equipped with a turbocharger (5), said device comprising:
 a first heat exchanger (7) placed in the air intake circuit (9),
 a second heat exchanger (10) placed on the main exhaust line (12) and connected to the first heat exchanger (7) to form a heating loop (A),
 said thermal management device (1) furthermore comprising a so-called low-pressure exhaust gas recuperation system (14), comprising a first take-off (141) placed downstream of the turbine (5b), an outlet (142) placed upstream of the compressor (5a), and a control valve (140),
 the second heat exchanger (10) being placed between the turbine (5b) and the first take-off (141),
 the main exhaust line (12) comprising a take-off branch (26) between a second take-off (201) placed on the (Continued)

Figure 1:
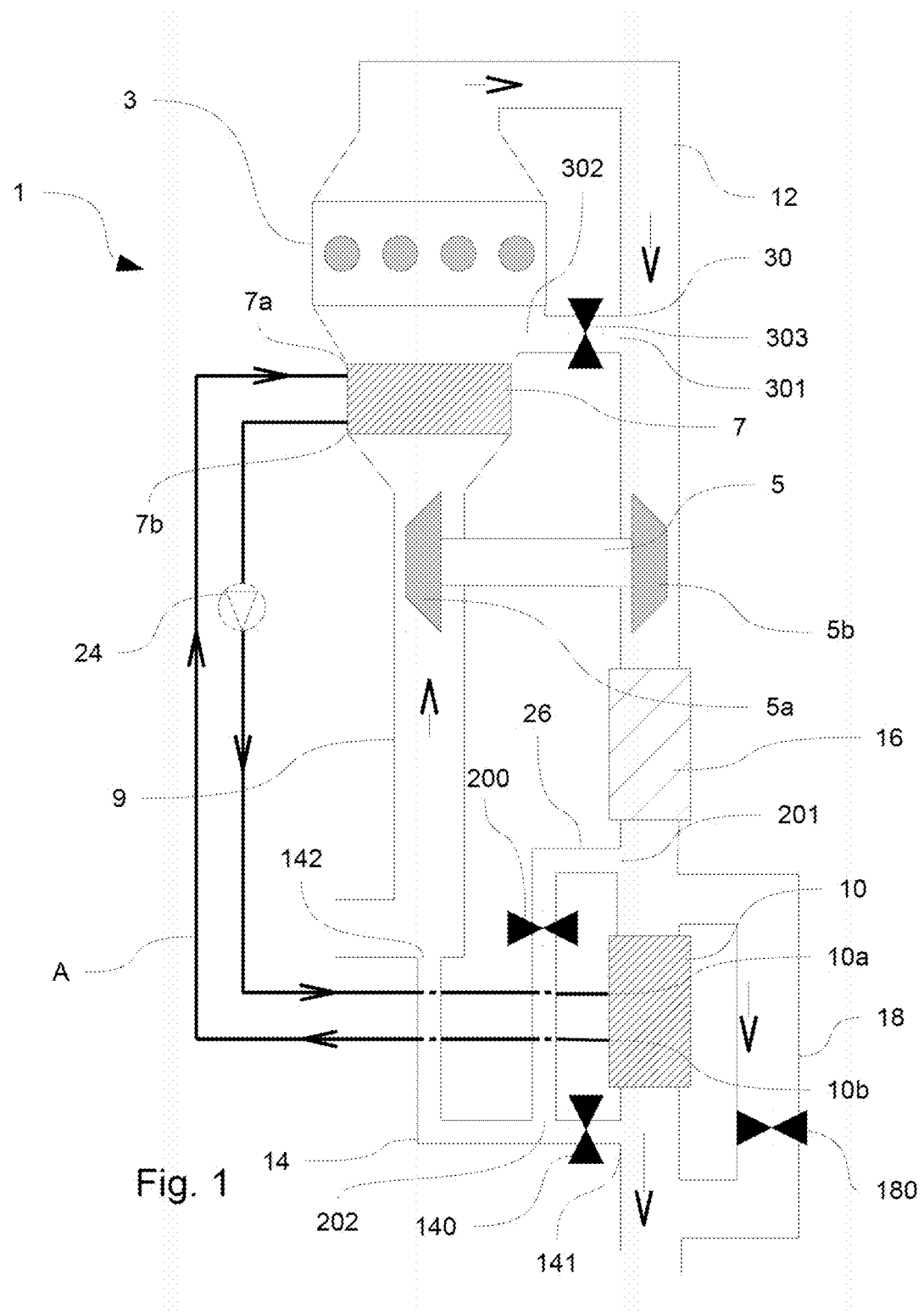

main exhaust line (12) upstream of the second heat exchanger (10), a take-off device (200) able to manage the circulation of the exhaust gases, and an outlet (202).

10 Claims, 4 Drawing Sheets

(51) Int. Cl.

| | | |
|---|---|---|
| *F01N 5/02* | (2006.01) | |
| *F02B 29/04* | (2006.01) | |
| *F02G 5/02* | (2006.01) | |
| *F02B 37/00* | (2006.01) | |
| *F01N 3/02* | (2006.01) | |
| *F02M 31/02* | (2006.01) | |
| *F02M 31/04* | (2006.01) | |
| *F02M 26/07* | (2016.01) | |
| *F02M 31/10* | (2006.01) | |
| *F02M 31/20* | (2006.01) | |

(52) U.S. Cl.
CPC ...... *F02B 29/0443* (2013.01); *F02B 29/0475* (2013.01); *F02B 37/00* (2013.01); *F02G 5/02* (2013.01); *F02M 26/07* (2016.02); *F02M 31/02* (2013.01); *F02M 31/042* (2013.01); *F02M 31/10* (2013.01); *F02M 31/205* (2013.01); *Y02T 10/126* (2013.01); *Y02T 10/144* (2013.01); *Y02T 10/146* (2013.01); *Y02T 10/16* (2013.01); *Y02T 10/166* (2013.01); *Y02T 10/20* (2013.01)

(58) Field of Classification Search
CPC ....... F02M 26/07; F01N 5/02; F02B 29/0443; F02B 29/0475; F02B 37/00; F02G 5/02; Y02T 10/20; Y02T 10/166; Y02T 10/146; Y02T 10/144
USPC ............................................ 123/568.11, 556
See application file for complete search history.

(56) References Cited

U.S. PATENT DOCUMENTS

| | | | |
|---|---|---|---|
| 2008/0149080 A1* | 6/2008 | Reuss ................ | F02B 29/0412 123/568.12 |
| 2009/0020106 A1* | 1/2009 | Iijima .................... | F02M 26/05 123/568.12 |
| 2010/0050634 A1* | 3/2010 | Yager .................... | F02M 26/05 60/605.2 |
| 2010/0095939 A1* | 4/2010 | Geskes ............... | F02B 29/0475 123/556 |
| 2011/0226223 A1* | 9/2011 | Potteau ............... | F02B 29/0418 123/568.21 |
| 2017/0234265 A1* | 8/2017 | Zhou .................... | F01K 13/003 60/615 |
| 2017/0328263 A1* | 11/2017 | Uhrich .................. | F02M 26/06 |
| 2017/0335805 A1* | 11/2017 | Zhang ...................... | F01P 3/20 |

OTHER PUBLICATIONS

Written Opinion of the International Searching Authority issued in corresponding application No. PCT/EP2016/053987 dated May 4, 2016 (6 pages).

\* cited by examiner

DEVICE FOR THE THERMAL MANAGEMENT OF ENGINE INTAKE AIR

The present invention concerns a device for thermal management of the intake air of an internal combustion engine of a motor vehicle, and more particularly a turbocharged internal combustion engine with a heat exchanger within the air intake circuit.

In cold climatic conditions, an internal combustion engine, in particular fueled by diesel, has difficulties in starting and increasing the temperature in comparison with a petrol-fueled engine. In fact, a heating time is necessary before the exhaust gases reach a sufficient temperature for the exhaust gas processing devices, such as for example the catalytic converter, to be able to be fully effective. Furthermore, cold climatic conditions may cause combustion problems on cold starting, and lead to excess fuel consumption and an increase in polluting emissions.

A solution known in the case of a vehicle equipped with a turbocharger and a heat exchanger placed in the air intake circuit to cool the intake air, is to bypass said exchanger via a bypass circuit so that the temperature of the exhaust gases rises more quickly. Furthermore, if the vehicle is also equipped with an exhaust gas recirculation system, it is also known to use a bypass circuit to bypass a heat exchanger placed in said exhaust gas recirculation system, and bring the hot exhaust gases into the air intake circuit.

Another known solution is to heat the intake air directly in the bypass circuit of the heat exchanger of the air intake circuit by means of an electric heater, as described in application DE 10 2007 029 036 A1, or by means of a second heat exchanger, again placed in the bypass circuit of the heat exchanger of the air intake circuit and connected to a heat exchanger placed in an exhaust gas recirculation circuit, as described in application DE 10 2007 005 246 A1.

However, such solutions for heating the intake air are not satisfactory since they are costly in terms of the energy to be used, or have an inadequate temperature rise time and take up substantial space in the engine compartment.

One of the aims of the invention is therefore to remedy the drawbacks of the prior art and propose an improved device for thermal management of intake air, in particular in cold climatic conditions.

The invention therefore concerns a device for the thermal management of the intake air of an internal combustion engine equipped with a turbocharger, said device comprising:
  a first heat exchanger comprising an inlet and an outlet for heat-transporting fluid, placed in the air intake circuit between the compressor and the engine,
  a second heat exchanger placed on the main exhaust line of the engine, capturing the thermal energy from the exhaust gas and transferring said energy to a heat-transporting fluid circulating in the heating loop from an outlet and an inlet for heat-transporting fluid, the inlet for heat-transporting fluid of the first heat exchanger being connected to the outlet for heat-transporting fluid of the second heat exchanger, and the outlet for heat-transporting fluid of the first heat exchanger being connected directly or indirectly to the inlet for heat-transporting fluid of the second heat exchanger, so as to form the heating loop,
  said thermal management device also comprising a so-called low-pressure exhaust gas recuperation system comprising a first take-off for the exhaust gases placed on the main exhaust line downstream of the turbine, an outlet for the exhaust gases placed in the air intake circuit upstream of the compressor, and a control valve,
  the second heat exchanger is placed between the turbine and the first take-off from the exhaust gas recuperation system,
  characterized in that the main exhaust line also comprises a take-off branch for the exhaust gases between a second take-off for the exhaust gases placed on the main exhaust line upstream of the second heat exchanger, a take-off device able to manage the circulation of exhaust gases, and an outlet for exhaust gases.

This take-off branch allows, when the heating loop is not yet "hot", a circulation of the low-pressure, still hot exhaust gases directly towards the air intake circuit. This therefore allows a faster rise in temperature of the internal combustion engine and hence allows a reduction in the polluting emissions and excess fuel consumption. In fact, on cold starting under cold external conditions, the heat-transporting fluid circulating between the second and the first heat exchangers, together with said heat exchangers, has a certain inertia which means that a heating time is required (of the order of one-hundredth of a second) for it to heat the intake air via the first heat exchanger.

According to one aspect of the invention, the outlet for the exhaust gases is placed on the exhaust gas recuperation system.

According to another aspect of the invention, the outlet for the exhaust gases is placed downstream of the control valve.

According to another aspect of the invention, the take-off device is an all-or-nothing valve arranged on said take-off branch.

According to another aspect of the invention, the take-off device and the control valve are grouped into a three-way valve arranged at the outlet of the take-off branch.

According to another aspect of the invention, the outlet for the exhaust gases is placed directly on the intake air circuit.

According to another aspect of the invention, the take-off device is a control valve able to vary the flow of exhaust gases within the take-off branch.

According to another aspect of the invention, the second heat exchanger is placed downstream of the exhaust gas processing devices.

According to another aspect of the invention, the main exhaust line comprises a bypass circuit of the second heat exchanger, the opening and closure of which are controlled by a bypass valve.

According to another aspect of the invention, the main exhaust line comprises a second, so-called high-pressure, exhaust gas recuperation system comprising a third take-off for the exhaust gases placed on the main exhaust line upstream of the turbine, and an outlet for the exhaust gases placed in the air intake circuit downstream of the first heat exchanger.

Figure 2:
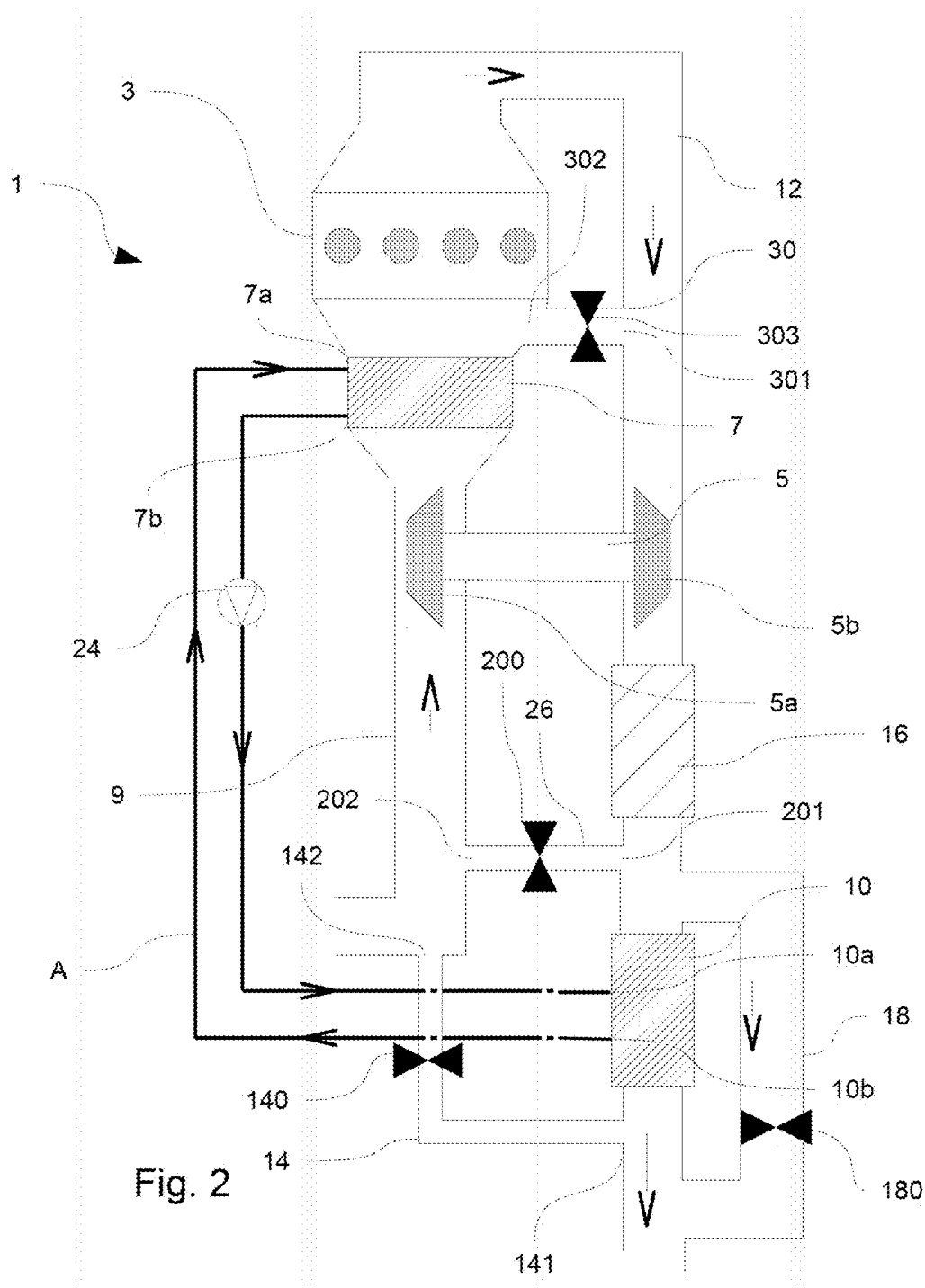
Figure 3:
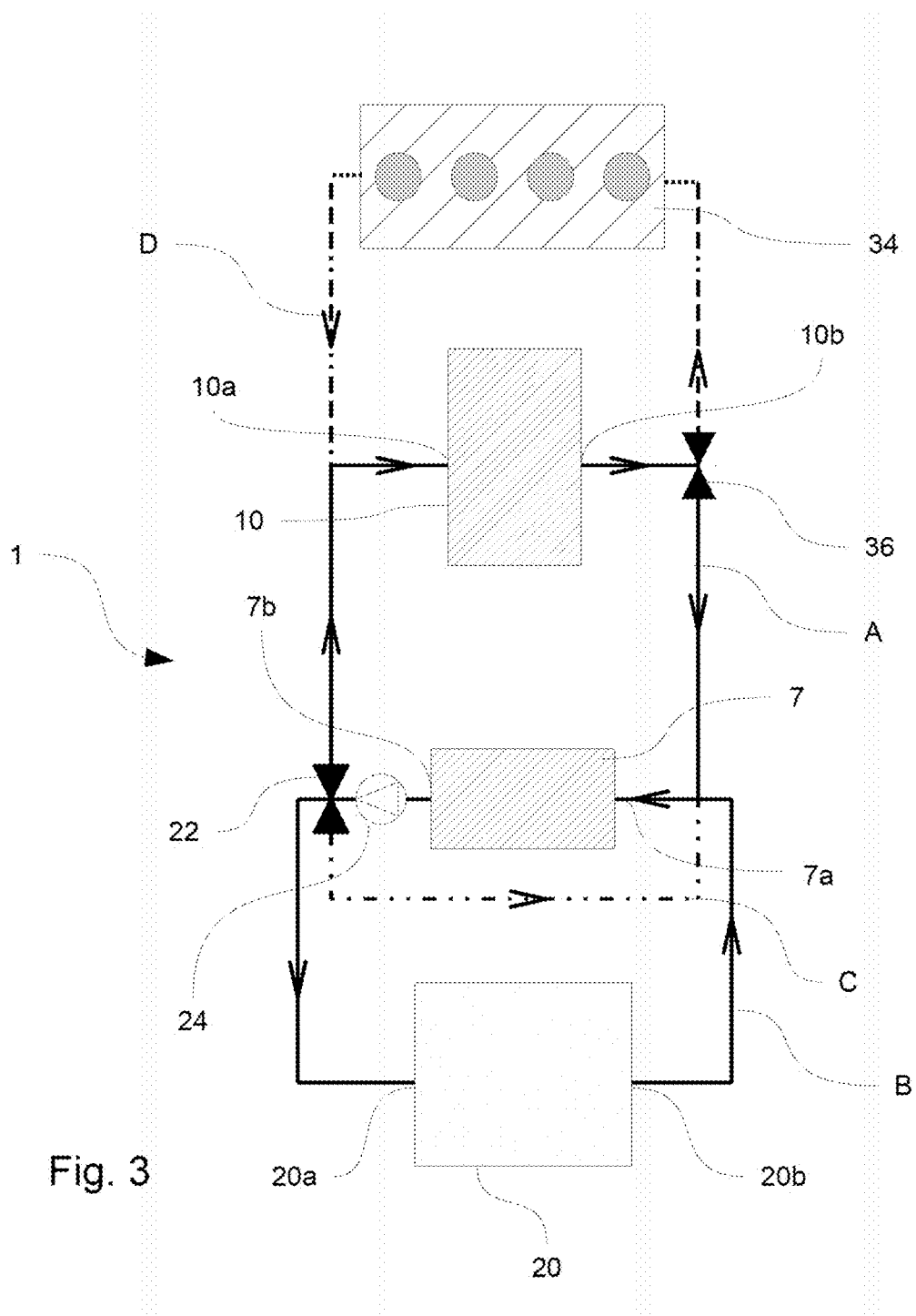
Figure 4:
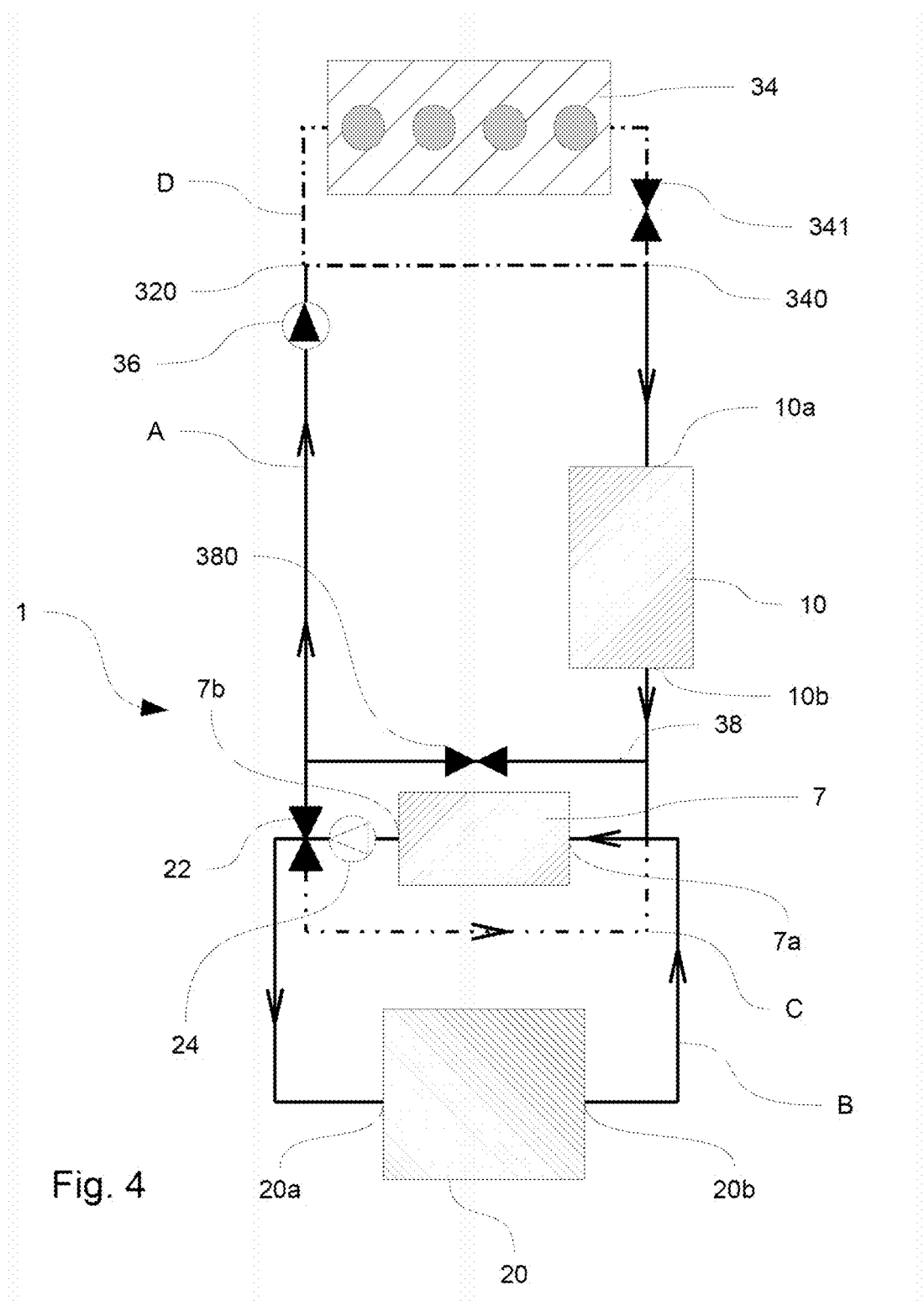

Further characteristics and advantages of the invention will appear more clearly from reading the description below which is given purely for illustrative purposes and is not limitative, in which:

FIG. 1 shows a diagrammatic representation of an internal combustion engine and its device for thermal management of the intake air according to a first embodiment, FIG. 2 shows a diagrammatic representation of an internal combustion engine and its device for thermal management of the intake air according to a second embodiment, FIG. 3 shows a diagrammatic representation of the circulation loops for heat-transporting fluid of a device for thermal management of the intake air according to a first embodiment, FIG. 4 shows a diagrammatic representation of the circulation loops for heat-transporting fluid of a device for thermal management of the intake air according to a second embodiment.

Identical elements carry the same references on the various figures.

FIG. 1 shows a diagrammatic representation of an internal combustion engine 3 equipped with a turbocharger 5, and its device 1 for thermal management of the intake air.

The engine 3, in particular diesel-fueled, comprises an air intake circuit 9 which brings air for combustion into the cylinders, and a main exhaust line 12 for evacuation of the exhaust gases. The engine 3 also comprises a turbocharger 5 with a turbine 5b placed in the main exhaust line 12, and a compressor 5a placed in the air intake circuit 9.

The main exhaust line 12 may also comprise, downstream of the turbine 5b, exhaust gas processing devices 16, for example a catalytic converter and/or a particulate filter.

The thermal management device 1 comprises, placed in the air intake circuit 9 between the compressor 5a and the engine 3, a first heat exchanger 7 comprising an inlet 7a and an outlet 7b for heat-transporting fluid. The thermal management device 1 also comprises a second heat exchanger 10 placed on the main exhaust line 12 of the engine 3, capturing the thermal energy of the exhaust gases and transferring said energy to a heat-transporting fluid circulating in a heating loop A from an outlet 10b for heat-transporting fluid towards the inlet 7a for heat-transporting fluid of the first heat exchanger 7 to which is connected. The heating loop A is thus formed by the direct or indirect connection of the outlet 7b for heat-transporting fluid of the first exchanger 7 and the inlet 10a for heat-transporting fluid of the second heat exchanger 10.

This location of the second heat exchanger 10 directly on the main exhaust line 12 allows a maximizing of the thermal energy available and recoverable for heating the intake air at the first heat exchanger 7. This therefore allows a faster rise in temperature of the engine and better combustion on cold starting in cold climatic conditions. This improved combustion leads to a reduction in fuel consumption and a reduction in polluting emissions.

The thermal management device 1 may also comprise a so-called low-pressure exhaust gas recuperation system 14. The main exhaust line 12 thus comprises a first take-off 141 for exhaust gases placed downstream of the turbine 5b and the exhaust gas processing devices 16, and opening into the air intake circuit 9 upstream of the compressor 5a at an outlet 142. The opening and closure of the exhaust gas recuperation system 14 are controlled by a control valve 140 which allows control of the flow of exhaust gas entering the exhaust gas recuperation system 14.

In this case, the second heat exchanger 10 is placed between the turbine 5b and the first take-off 141 from the exhaust gas recuperation system 14, preferably downstream of the exhaust gas processing devices 16. This guarantees the efficiency and rise in temperature of the exhaust gas processing devices, since the exhaust gases passing through them have not undergone any extraction of thermal energy by the second heat exchanger.

This location of the second heat exchanger 10 between the turbine 5b and the first take-off 141 from the exhaust gas recuperation system 14 allows the second heat exchanger 10 to also act as a heat exchanger for the exhaust gas recuperation system 14, and thus if necessary cool the exhaust gases intended to be returned to the air intake circuit 9. Furthermore, the location of the second exchanger directly on the main exhaust line 12 in this case allows recovery of the thermal energy of the exhaust gases even if the exhaust gas recuperation system 14 is closed. This energy recuperation may also be carried out on the total flow of the exhaust gases.

In the case where it is necessary to heat the intake air or cool the exhaust gases, it is possible to bypass the second exchanger 10 via a bypass circuit 18 placed on the main exhaust line 12, the opening and closure of which are controlled by a valve 180.

The first heat exchanger 7 may also play the known role of cooling the intake air if the latter is too hot for combustion in the cylinders of the engine 3, and thus, by cooling, increase the quantity of intake air reaching the cylinders. For this, the first heat exchanger 7 is also connected to a cooling loop B, as shown on FIGS. 3 and 4 illustrating the different circulation loops for heat-transporting fluid.

This cooling loop B connects the outlet 7b for heat-transporting fluid of the first heat exchanger 7 to the inlet 20a for heat-transporting fluid of a low-temperature radiator 20, and connects the outlet 20b for heat-transporting fluid of said low-temperature radiator 20 to the inlet 7a for heat-transporting fluid of the first heat exchanger 7.

The first exchanger 7 may also be connected to a bypass loop C connecting together the inlet 7a and outlet 7b for heat-transporting fluid of said first heat exchanger 7. This bypass loop C is useful when it is not necessary to cool or heat the intake air, and nonetheless allows the heat-transporting fluid to circulate in order to avoid the phenomena of boiling, and also allows homogenization of the temperature of the heat-transporting fluid.

The main exhaust line 12 also comprises a take-off branch 26 for exhaust gases. This take-off branch 26 is formed between a take-off 201 for the exhaust gases placed on the main exhaust line 12 upstream of the second heat exchanger 10, and an outlet 202 for exhaust gases allowing arrival of said exhaust gases in the air intake circuit 9. Said take-off branch 26 comprises a take-off device 200 able to manage the circulation of the exhaust gases inside it.

This take-off branch 26, when the heating loop A is not yet "hot", allows circulation of the low-pressure, still hot exhaust gases directly towards the air intake circuit 9. This therefore allows a faster rise in temperature of the internal combustion engine 3 and hence a reduction in polluting emissions and excess fuel consumption. In fact, during cold starting in cold external conditions, the heat-transporting fluid circulating between the second heat exchanger 10 and the first heat exchanger 7, together with said heat exchangers, has a certain inertia which means that a heating time is necessary (of the order of one-hundredth of a second) for it to be able to heat the intake air via the first heat exchanger 7.

According to a first embodiment illustrated in FIG. 1, the outlet 202 for exhaust gases from the take-off branch 26 is placed on the exhaust gas recuperation system 14. The outlet 202 may for example be positioned downstream of the control valve 140. The take-off device 200 may then be an all-or-nothing valve arranged on said take-off branch 26.

The all-or-nothing valve allows, depending on need, the passage of exhaust gases circulating in the main exhaust line 12 directly into the exhaust gas recuperation system 14 when the control valve 140 is closed. The exhaust gases reaching the air intake circuit 9 are then hot since they have not passed through the second heat exchanger 10.

In a variant of this first embodiment (not shown), the take-off device 200 and the control valve 140 may be grouped into a three-way valve arranged at the outlet 202 of the take-off branch 26. In this variant, the three-way valve allows a choice of whether the exhaust gases reaching the air intake circuit 9 are taken from the first take-off 141 or the second take-off 201.

According to a second embodiment illustrated in FIG. 2, the outlet 202 of the exhaust gases from the take-off branch 26 is placed directly on the air intake circuit 9. In this second embodiment, the take-off device 200 is preferably a control device of the same type as the control device 140. This control device 200 is able to vary the flow of exhaust gases within the take-off branch 26 in the direction of the air intake circuit 9 as required.

The main exhaust line 12 may also comprise a second, so-called high-pressure, exhaust gas recuperation system 30. This high-pressure exhaust gas recuperation system 30 comprises a third take-off 301 for the exhaust gases placed on the main exhaust line 12 upstream of the turbine 5b, and an outlet 302 for the exhaust gases placed in the air intake circuit 9 downstream of the first heat exchanger 7. Said second high-pressure exhaust gas recuperation system 30 may also comprise a shut-off valve 303 for controlling the passage of the exhaust gases.

As shown in FIGS. 3 and 4, a four-way valve 22 may be placed at one of the junctions between the heating loop A, the cooling loop B and the bypass loop C so as to control the circulation of the heat-transporting fluid into one of said heating A, cooling B or bypass C loops.

This four-way valve 22 may be placed either upstream or downstream of the first heat exchanger 7.

Thus the four-way valve 22 may be placed downstream of the first heat exchanger 7 and therefore comprise an inlet and three outlets for heat-transporting fluid, the inlet for heat-transporting fluid being connected to the outlet 7b for heat-transporting fluid of the first heat exchanger 7, and each of the three outlets for heat-transporting fluid being connected to one of the heating A, cooling B and bypass C loops.

Similarly, the four-way valve 22 may be placed upstream of the first heat exchanger 7 and therefore comprise three inlets and one outlet for heat-transporting fluid, the outlet for heat-transporting fluid being connected to the inlet 7a for heat-transporting fluid of the first heat exchanger 7, and each of the three inlets for heat-transporting fluid being connected to one of the heating A, cooling B and bypass C loops.

It is also quite possible to imagine another embodiment, wherein the four-way valve 22 may be replaced by two three-way valves or by a set of single shut-off valves placed on each branch.

A circulation pump 24 for heat-transporting fluid is also placed between one of the junctions between the heating A, cooling B and bypass C loops and the first heat exchanger 7, to set the heat-transporting fluid in motion.

Again as illustrated on FIGS. 3 and 4, the second heat exchanger 10 is also connected to an engine thermal management loop D. This engine thermal management loop D in particular comprises the thermal management system 34 of the engine 3. This thermal management system 34 of the engine 3 may in particular comprise a heat exchanger placed at said engine 3, a pump and a high-temperature radiator for evacuating the thermal energy from said engine 3.

The communication between the second heat exchanger 10 and the thermal management loop D allows for example assistance with heating the cab or the engine 3. Furthermore, this connection is necessary for cooling exhaust gases intended for the exhaust gas recuperation system 14 when it is not necessary to heat the intake air.

According to a first embodiment of the connection between the second heat exchanger 10 and the thermal management loop D illustrated on FIG. 3, said second heat exchanger 10 is connected in parallel to the thermal management system 34 of the engine 3. The engine thermal management loop D rejoins the heating loop A upstream of said second heat exchanger 10, and the two loops diverge downstream of said second heat exchanger 10.

A three-way valve 36 is placed at one of the junctions between the heating loop A and the engine thermal management loop D so as to control the circulation of the heat-transporting fluid in one of said heating A or engine thermal management D loops.

According to a second embodiment of the connection between the second heat exchanger 10 and the thermal management loop D illustrated in FIG. 4, the inlet 10a for heat-transporting fluid of the second heat exchanger 10 is connected to a partial take-off 340 for heat-transporting fluid from the engine thermal management loop D. Said partial take-off 340 is situated downstream of a mechanical pump 36 belonging to the thermal management system 34 of the engine 3. The injection of heat-transporting fluid from the engine thermal management loop D to the heating loop A may be controlled by a shut-off valve 341 or by a three-way valve positioned on the partial take-off 340.

The outlet 10b for heat-transporting fluid of the second heat exchanger 10 is itself connected directly or indirectly to a reinjection 320 of heat-transporting fluid into the engine thermal management loop D.

Furthermore, in this second embodiment, the heating loop A comprises a bypass circuit 38 of the first heat exchanger 7. Said bypass circuit 38 directly connects the outlet 10b for heat-transporting fluid of the second heat exchanger 10 and the reinjection 320 of heat-transporting fluid into the engine thermal management loop D, said bypass circuit 38 also comprising an opening/closing valve 380.

The indirect connection of the outlet 10b for heat-transporting fluid of the second heat exchanger 10 is itself achieved via the first heat exchanger 7 and the four-way valve 22.

This second embodiment in particular allows a saving in the electrical power supply to the circulation pump 22 for heat-transporting fluid in the circulation of the heat-transporting fluid inside the heating loop A. In fact in this embodiment, circulation of the heat-transporting fluid inside the heating loop A may be ensured by the mechanical pump 36 of the engine thermal management loop D.

Depending on which circulation loops for heat-transporting fluid are used for circulation, it is possible to define a method for thermal management of the temperature of the intake air of the engine 3. This management method corresponds to the switching of the thermal management device 1 for the intake air from one operating mode to another by selection of the loops in which the heat-transporting fluid circulates. This selection is made in particular as a function of setpoints sent by a control device, for example electronic.

The various operating modes are therefore:
 a first mode of heating the intake air, in which the four-way valve 22 closes the heating loop A, the heat-transporting fluid recovering thermal energy from the exhaust gases by the second heat exchanger 10 and returning it to the intake air at the first heat exchanger 7. This operating mode is used to heat the intake air at the first heat exchanger 7.

a second mode of heating the intake air, in which the intake air is heated directly by the low-pressure, hot exhaust gases from the take-off branch 26. This operating mode is used on cold start of the vehicle in cold external conditions while the heating loop A is being heated because of the inertia of the heat-transporting fluid and heat exchangers.

a cooling mode, in which the four-way valve 22 closes the cooling loop B, the heat-transporting fluid recovering the thermal energy from the intake air by the heat first heat exchanger 7 and dissipating it at the low-temperature radiator 20. This cooling mode is used to cool the intake air at the first heat exchanger 7.

a bypass mode, in which the four-way valve 22 closes the bypass loop C, the intake air being neither heated nor cooled, the heat-transporting fluid circulating directly from the outlet 7b to the inlet 7a for heat-transporting fluid of the first heat exchanger 7. This operating mode is used in particular when it is not necessary to heat or cool the intake air, but circulation of the heat-transporting fluid is nonetheless necessary in order to avoid phenomena of boiling and to homogenize the temperature of the heat-transporting fluid.

a control mode, in which the four-way valve 22 allows passage of the heat-transporting fluid both into the bypass loop C and into the cooling loop B. This embodiment may be used to perform fine adjustment of the temperature of the intake air, in particular when said temperature is rising but has not yet reached a sufficient level to justify cooling.

In the case where the second heat exchanger 10 is also connected to the engine thermal management loop D, the thermal management process may comprise an additional operating mode:

a diversion mode, in which the heat-transporting fluid circulates between the second heat exchanger 10 and the engine thermal management loop D.

This diversion mode may be used in particular to cool the exhaust gases at the second heat exchanger 10 and evacuate this thermal energy at the high-temperature radiator of the thermal management system 34 of the engine 3.

This embodiment may also be used simultaneously with the cooling mode, the bypass mode or the control mode.

In the latter operating mode, the implementation varies depending on the embodiment of the connection between the second heat exchanger 10 and the thermal management loop D.

In the first embodiment illustrated in FIG. 3, diversion mode is achieved using the three-way valve 36 which directs the heat-transporting fluid towards the engine thermal management loop D.

In the second embodiment illustrated in FIG. 4, diversion mode is achieved using the opening/closing valve 380 which opens the bypass circuit 38 of the first heat exchanger 7.

Thus it is evident that the thermal management device 1 for the intake air, because of the direct location of a second exchanger 10 on the main exhaust line 12 and its direct connection to the first exchanger 7 placed in the air intake circuit 9, allows a better rise in temperature of the intake air, in particular because of the presence of the take-off branch 26 which then allows, on cold starting, heating of the intake air by mixing it with the hot exhaust gases while the heat-transporting fluid circulating between the second 10 and the first 7 heat exchangers also rises in temperature and can itself heat the intake air via the first heat exchanger 7.

The invention claimed is:

1. A device for thermal management of the intake air of an internal combustion engine equipped with a turbocharger, said device comprising:
a first heat exchanger comprising an inlet and an outlet for heat-transporting fluid, placed in the air intake circuit between the compressor and the engine;
a second heat exchanger placed on the main exhaust line of the engine, capturing the thermal energy from the exhaust gas and transferring said energy to a heat-transporting fluid circulating in the heating loop from an outlet and an inlet for heat-transporting fluid, the inlet for heat-transporting fluid of the first heat exchanger being connected to the outlet for heat-transporting fluid of the second heat exchanger, and the outlet for heat-transporting fluid of the first heat exchanger being connected directly or indirectly to the inlet for heat-transporting fluid of the second heat exchanger to form the heating loop; and
a low-pressure exhaust gas recuperation system comprising a first take-off the exhaust gases placed on the main exhaust line downstream of the turbine, an outlet for the exhaust gases placed in the air intake circuit upstream of the compressor, and a control valve,
the second heat exchanger is placed between the turbine and the first take-off for the exhaust gas recuperation system,
wherein the main exhaust line further comprises a take-off branch for the exhaust gases between a second take-off for the exhaust gases placed on the main exhaust line upstream of the second heat exchanger, a take-off device able to manage the circulation of exhaust gases, and an outlet for exhaust gases.

2. The thermal management device as claimed in claim 1, wherein the outlet for the exhaust gases is placed on the exhaust gas recuperation system.

3. The thermal management device as claimed in claim 2, wherein the outlet for the exhaust gases is placed downstream of the control valve.

4. The thermal management device as claimed in claim 3, wherein the take-off device is an all-or-nothing valve arranged on said take-off branch.

5. The thermal management device as claimed in claim 2, wherein the take-off device and the control valve are grouped into a three-way valve arranged at the outlet of the take-off branch.

6. The thermal management device as claimed in claim 1, wherein the outlet for the exhaust gases is placed directly on the intake air circuit.

7. The thermal management device as claimed in claim 6, wherein the take-off device is a control valve able to vary the flow of exhaust gases within the take-off branch.

8. The thermal management device as claimed in claim 1, wherein the second heat exchanger is placed downstream of the exhaust gas processing devices.

9. The thermal management device as claimed in claim 1, wherein the main exhaust line comprises a bypass circuit of the second heat exchanger, the opening and closure of which are controlled by a bypass valve.

10. The thermal management device as claimed in claim 1, wherein the main exhaust line comprises a second, high-pressure exhaust gas recuperation system comprising a third take-off for the exhaust gases placed on the main exhaust line upstream of the turbine, and an outlet for the exhaust gases placed in the air intake circuit downstream of the first heat exchanger.

\* \* \* \* \*